United States Patent [19]

Domesle et al.

[11] Patent Number: 5,446,006
[45] Date of Patent: Aug. 29, 1995

[54] MONOLITHIC CATALYST WITH A METAL CARRIER

[75] Inventors: Rainer Domesle, Alzenau; Bernd Engler; Egbert Lox, both of Hanau, all of Germany

[73] Assignee: Degussa Aktiengesellschaft, Frankfurt, Germany

[21] Appl. No.: 130,132

[22] Filed: Oct. 4, 1993

[30] Foreign Application Priority Data

Oct. 5, 1992 [DE] Germany ............... 42 33 404.7

[51] Int. Cl.⁶ ............................................. B01J 21/00
[52] U.S. Cl. ....................................... 502/439; 502/527
[58] Field of Search ........................... 502/439, 527

[56] References Cited

U.S. PATENT DOCUMENTS

| | | |
|---|---|---|
| 4,402,871 | 9/1983 | Retallick . |
| 4,753,919 | 6/1988 | Whittenberger . |
| 4,931,421 | 6/1990 | Shibata ............................. 502/527 |
| 4,985,388 | 1/1991 | Whittenberger ................... 502/439 |
| 4,987,034 | 1/1991 | Hitachi et al. ..................... 502/527 |

FOREIGN PATENT DOCUMENTS

| | | |
|---|---|---|
| 0245736 | 11/1987 | European Pat. Off. . |
| 0245737 | 11/1987 | European Pat. Off. . |
| 0509207 | 10/1992 | European Pat. Off. . |
| 509207A1 | 10/1992 | European Pat. Off. . |
| 896294 | 12/1989 | Finland . |
| 2243251 | 3/1974 | Germany . |
| 2720322 | 11/1978 | Germany . |
| 2727967 | 1/1979 | Germany . |
| 3925845 | 2/1991 | Germany . |
| 4016276 | 6/1991 | Germany . |
| 4025434 | 2/1992 | Germany . |
| 4112354A1 | 10/1992 | Germany . |
| 2063748 | 6/1981 | United Kingdom . |
| WO90/03220 | 4/1990 | WIPO . |
| PCT/EP920-0796 | 10/1992 | WIPO . |

*Primary Examiner*—Anthony McFarlane
*Attorney, Agent, or Firm*—Beveridge, DeGrandi, Weilacher & Young

[57] ABSTRACT

Monolithic catalysts with a metal carrier that includes a catalytically coated matrix having at least one stack of several sheet-metal strips of corrugated or alternately corrugated and flat metal strips folded or intertwined with one another are described. The free ends of the metal strips are connected by a joining process with a surrounding jacket tube of any required cross-section. The monolithic catalyst is produced very economically and with a catalytic coating that has a uniform thickness. The at least one stack of sheet-metal strips required for the monolithic catalyst with a metal carrier is assembled from coated metal ribbons cut to length so as to form metal stacks. The stacks may be folded and/or intertwined with themselves or with one another so as to form the matrix. The matrix with intertwined and coated strips is inserted into the jacket tube and the free ends of the metal strips are secured by joining to the jacket tube. The coated metal strips may be formed by coating long metal ribbons with catalytic coating in a continuous operation prior to cutting the ribbons to the required length. The metal ribbon is also preferably corrugated prior to the coating step but can also be corrugated after the coating step. In another embodiment, the matrix is formed of a single, continuous and at least partially corrugated metal strip which is folded on to itself so as to form a stack arrangement.

38 Claims, 3 Drawing Sheets

MONOLITHIC CATALYST WITH A METAL CARRIER

FIELD OF THE INVENTION

The present invention is directed at a monolithic catalyst with a catalytically coated metal carrier comprising a matrix with gas passages made up of at least one metal strip welded into a jacket tube and a process for assembling a monolithic catalyst with metal carrier.

The monolithic catalyst has a generally cylindrical form of any suitable cross section with inlet and outlet ports allowing gases to enter the catalyst, pass through and leave the catalyst. While passing through the matrix the gases are brought into close contact with the catalytic coating thereon resulting in chemical changes of the gas composition.

One major application area of such catalyst is the exhaust gas cleaning of internal combustion engines. For that purpose the monolithic catalyst is often equipped at its inlet and outlet with fastening means, such as cones, for insertion into the exhaust gas lines of internal combustion engines. The assembly consisting of monolithic catalyst and fastening means is usually called a catalytic converter. Several monolithic catalysts may be incorporated into one catalytic converter. However, sometimes the monolithic catalyst is also regarded as a catalytic converter.

BACKGROUND OF THE INVENTION

Generic metal carriers for monolithic catalyst are described, e.g., in DE-OS 40 25 434 or DE-PS 40 16 276 as well as in EP 0 245 736 and EP 0 245 737. The metal-carrier matrix consists, usually of a ferritic Cr—, Al— containing iron alloy which is resistant to high temperature with further important constituents, such as traces of Ce, Zr, Y, rare-earth, alkaline earth and/or alkaline metals, the purpose of which is to increase the temperature resistance and to prevent flaking of the protective layer of oxide on the steel.

According to the aforementioned patent applications and laid-open specifications the metal-carrier matrix is produced by intertwining one or several sheet-metal stacks consisting of corrugated or alternately corrugated and flat metal strips and the matrix is subsequently inserted into a jacket tube. This is followed by joining the metal strips to the jacket tube at the points where they contact the inner surfaces of the jacket tube in order to secure the metal matrix in the jacket tube by means of an appropriate joining process.

A joining process which is relied upon uses the costly method of high-temperature soldering in a high vacuum at temperatures above 1100° C. Different welding processes such as electron-beam welding (DE-OS 27 20 322) and laser-beam welding (DE-OS 27 27 967) are described with respect to metal carriers having a spirally coiled matrix.

The metal strips may be obtained from long metal ribbons by cutting these ribbons to the desired lengths.

The metal carriers thus produced are then coated with an activity-enhancing intermediate layer of finely dispersed metal oxides having a large surface area and promoters. This coating layer is generally referred to as the washcoat, and it supports catalytically active precious metals. The metal carriers are then subsequently welded (e.g., at the ends of the carrier's jacket tube) into the exhaust system of an internal combustion engine.

An advantageous feature of metal carriers or monolithic catalysts with a metal carrier produced by high-temperature soldering is the high mechanical stability of the metal carriers. Outward displacement or telescoping of the metal-carrier matrix from the jacket tube due to the exhaust gas pressure and stresses arising from changes of temperature is typically not observed with monolithic catalysts such as these. This stability is due to the fact that the free ends of each individual strip of metal are firmly connected with the jacket tube.

However, the coating of the finished metal carrier produced in accordance with the above-described method results in highly non-uniform coating thicknesses. The non-uniform coating thickness is due to the fact that in the corners along the contact line between two neighboring metal strips, which usually form an acute angle but may also be right-angled, the capillary forces cause more coating material to accumulate in these areas than on the free surfaces. This non-uniform coating of the matrix results in increased consumption of coating material and precious metals. Coating after the metal carriers have been finished thus constitutes an additional, costly production step.

Another process for manufacturing monolithic catalysts with a metal carrier, which is in competition with the production process described above, commences with the application of the activity-enhancing intermediate layer and the precious metals on flat and/or corrugated metal strips. Depending on the way the strips are embossed, the application step is followed by spiral coiling of corrugated strips only or both a flat and a corrugated strip. The coiled strips are pressed into the jacket tube subject to appropriately intense prestressing. However, durability tests conducted on this type of monolithic catalyst with a metal carrier have shown that, in view of the severe stresses to which the monolithic catalyst is subjected to in a motor vehicle, the rough points of contact between the metal strips are not sufficient to prevent, as a result of the exhaust gas pressure, outward displacement or telescoping of the matrix from the jacket tube. By way of remedy, specially designed metal pins were driven from one side of the jacket through the matrix to the other side of the jacket and welded to the jacket tube in order to prevent lateral escape of the exhaust gas from the monolithic catalyst. This design of monolithic catalysts with a metal carrier is disclosed in Finnish patent application 896 294. However, in stringent tests under conditions approaching those of practical operation various versions of this method also offered only imperfect protection against the aforementioned failures, since the ferritic steel used begins to soften at temperatures between 550° and 900° C., depending on the exact composition of the material, and the vibrations and gas pulsations in the exhaust system cause the matrix in the region of the retaining pin to be loosened and detached.

Moreover it will be readily appreciated that the smaller the cellular density of the metal carrier, the lower is the retaining effect of the metal pin. Hence, for reasons of durability, low cellular densities of about 30 cells/cm$^2$ are barely practical.

Furthermore, the fitting of a retaining pin increases both the loss of pressure and the weight of a monolithic catalyst with a metal carrier of this type, thus reducing its advantage by comparison with respect to the other type of monolithic catalyst with a metal carrier.

SUMMARY OF THE INVENTION

The invention relates to a monolithic catalyst with a metal carrier comprising a catalytically coated matrix having at least one stack of at least one sheet metal strip which is positioned to provide high matrix/exhaust gas contact and at the same time to allow exhaust gas flow from the inlet to the outlet of the monolithic structure. If a single sheet metal strip is used to form a stack, it is folded in a zigzag manner. When using a plurality of stacks, the sheet metal stacks are preferably folded and/or intertwined with themselves or with one another and arranged to extend along the length of a surrounding jacket. A sheet-metal stack is either comprised completely of corrugated metal strips (which corrugations can take on any desired shape that provides good gas/surface contact) or a combination of alternately arranged corrugated and flat metal strips. The metal strips are connected by a joining process at their points of contact with the surrounding jacket tube which can be of any cross-section desired or required under the circumstances.

It is therefore an object of the present invention to provide a monolithic catalyst with a metal carrier possessing the same high mechanical strength as those monolithic catalyst having a metal carrier matrix in which the points of contact between the matrix and the surrounding jacket tube are connected by a joining process. However, unlike those previous monolithic catalysts, the monolithic catalyst of the present invention is further characterized by excellent uniformity of the coating on the metal strips and is, in particular, free from increased accumulation of coating dispersion in the corners along the lines of contact between two metal strips.

According to the invention this object is achieved by means of a monolithic catalyst with a metal carrier of generic type (e.g., a metal carrier formed from sheet metal-stacks).

In one embodiment, the matrix of the present invention is composed of metal strips of a required length or lengths which may be flat or corrugated and which had previously been coated with a catalytic coating. However, corrugation of a flat metal strip after coating is also within the scope of this invention.

These coated metal strips are arranged in at least one stack which may be folded and/or intertwined along its length or with at least one other stack so as to form a matrix with gas passages. The gas passages are obtained by composing the stacks from alternating flat and corrugated metal strips or of alternating metal strips with the same or different corrugations. The matrix is then inserted into the jacket tube and the metal strips are connected with the jacket tube by a joining technique such as welding at the points of contact between said strips and said tube.

The jacket tube may also consist of two half-tubes which may have welding flanges along their longitudinal edges for welding both halves together. Such half-tubes are also called clamp shells and are disclosed in DE-OS 39 25 845 and DE-AS 22 43 251. The jacket tube may be of any suitable cross section such as circular, oval or rectangular.

One important aspect of the invention resides in the fact that preferably each of the metal strips is joined to the jacket tube at least once to yield a matrix of high mechanical strength. More preferably, both end portions of the metal strips are joined to the jacket tube.

In another embodiment of the invention the matrix is composed of at least one stack of at least one zigzag folded metal strip. Such a matrix of one stack may be inserted into a jacket tube of rectangular cross section thus yielding lines of contact with the jacket tube not only at the end portions of the strip but also at every bend of the metal strip. Joining the matrix to the jacket tube at these lines of contact yields a very rigid monolithic catalyst. Optionally, at least one stack may be folded and intertwined.

It is to be understood that the catalytic coating can be of any formulation known in the art for catalysts comprising a catalytic coating on a monolithic carrier, especially those which are used for exhaust gas purification of internal combustion engines. Only by way of example, this coating may comprise finely dispersed high surface area metal oxides as support material for catalytically active components. Catalytically active components which are frequently used alone or in combination are precious metals from the platinum group such as platinum, palladium, rhodium, iridium and ruthenium but also non-precious metals, commonly referred to as base metals, may be used as the only catalytically active components such as nickel, copper and iron. The catalytically active components can also comprise so called promoters which are able to modify the catalytic activity of the other components, e.g., to increase the selectivity in a certain reaction. Examples of some promoters are zirconium oxide, nickel oxide, iron oxide and rare earth oxides.

The catalytically active components are commonly deposited onto the high surface area support material by way of impregnation. For that purpose an aqueous solution of water soluble precursor compounds of the desired components are used. But some of the catalytic components may also be added to the support material as finely divided solids. By way of calcination and/or reduction, the precursor compounds are transformed into the final catalytically active components. The relevant techniques are well known to those skilled in the art.

Thus, the invention is not restricted to any specific catalytic formulation but may advantageously be used with all of such catalytic materials.

The coated metal strips may be prepared from a long metal ribbon by coating this ribbon with the catalytic coating in a continuous operation and then cutting it to the required lengths so as to form the coated metal strips. Alternatively, the ribbon may first be cut to length followed by subsequent coating of the metal strips.

So as to achieve a durable contact between the jacket tube and the metal strips it is advisable before welding to clean the latter at the intended points, lines or areas of contact by mechanical means (e.g., with the aid of a brush) or to remove the coating chemically by etching or dissolving (e.g., with acids or alkaline or complexing agents) entirely or in part.

It is also possible to coat the metal strips prior to applying the catalytic coating with a layer of release agent to the subsequent zones (points, lines or areas) of contact with the jacket tube, whereby said layer of release agent prevents catalytic coating or makes it easier to remove the catalytic coating prior to welding. Suitable release agents include waxes, oils and water repellent substances. Of course, it is also possible to avoid coating at the subsequent zones of contact by using mechanical protection means or self-adhesive tapes during the coating operation. The self-adhesive tapes are removed by heat treatment during calcination.

Welding techniques suitable for use in the present invention are electronbeam welding or laser-beam welding, but other welding methods are also feasible. When choosing a welding technique it is essential however for the matrix, apart from its zones of contact with the jacket tube, to be exposed only to moderate temperatures (e.g., up to 300° C.) during the welding process, in order to avoid thermal damage to the catalytic coating.

For the above reasons soldering of the coated metal strips into the jacket tube is only possible with a very few special types of coating and cannot be used in the great majority of cases, since with the standard soldering processes the entire matrix is heated to high temperatures together with the jacket. Hence, successful soldering processes are essentially only those in which, as is the case with welding, the matrix is heated to the soldering temperature only in the region of the jacket.

The matrix can be secured to the jacket tube by means of any type and number of continuous or intermittent welding seams on the periphery. The welding seams on the surface of the jacket may be e.g. of helical, annular, sinusoidal or saw-tooth design, and it is possible, for reasons of manufacture, to modulate a secondary type of welding seam onto the primary type. Intermittent welding seams are also feasible, e.g. if they are arranged at an oblique angle to the jacket tube.

So as to achieve a high degree of strength during continuous operation it may be advantageous to arrange the welding seams only in certain zones of the jacket, e.g. in the proximity of the subsequent exhaust gas inlet or outlet.

Preferred embodiments of monolithic catalysts produced in this way, particularly such with frontal areas larger than 15 cm$^2$, provide for a matrix structure consisting of stacked metal strips possibly deformed after stacking with alternately flat and corrugated strips e.g. according to DE-OS 40 16 276 or DE-OS 38 32 243, whereby the end of each metal strip is in contact with the jacket. The same applies to a matrix structure with involute-type layers according to EP-PS 0 245 736.

A flat strip need not be used if the corrugated strips are such that folding (cf. e.g., U.S. Pat. No. 4,402,871) or stacking possibly followed by intertwining gives rise to channels through which gas can flow. Corrugated metal strips may for instance be such with herringbone structure (U.S. Pat. No. 4,753,919) or slotted strips with an appropriate embossed pattern.

Welding-in the strips according to the invention is particularly important and advantageous if the flat and/or corrugated metal strips are provided with, for example, punched holes, slots, perforation of any type etc. and are, in addition, provided with embossed patterns modulating a special structure onto the metal strips. Monolithic carriers with these type of metal strips can be coated only with difficulty by a normal production method, i.e. by immersion, suction or spraying, since excessive coating material can generally only be removed to an inadequate extent, e.g. by blowing out with compressed air or by sucking air through the carrier.

Moreover, with these type of metal carriers the very fact that the aqueous coating dispersion is subject to surface tension causes increased accumulation of coating material in the immediate proximity of the perforations and may even block them and make them ineffective. Such an undesirable non-uniform coating can be avoided if, with the metal strips as described, each perforated strip is first individually coated, optionally cut to length and then welded into a jacket tube.

With a view to ensuring a high durability of monolithic catalysts with metal carriers according to the invention, the design of the metal strips in the vicinity of the jacket tube is of decisive importance. Preferred is a design in which the corrugated strips have, on the jacket side, smooth ends or a very flat or very low amplitude corrugation hugging a part of the jacket tube.

In this case, said corrugated strips are welded in one operation both to the adjacent equally long flat strips and to the jacket tube. Apart from welding the matrix to the jacket tube, other additional constructional methods may be applied in order to secure the matrix. Such measures include, for example, providing a jacket tube with a slight taper or providing beads in the jacket tube. Provisional fixing with the aid of ceramic adhesives such as Ceramabond or Ultra-Temp from Aremco Products, Inc., Ossining, N.Y. is also possible. The metal matrix with catalytically active coating being introduced into the jacket tube (or alternatively into the clamp shells) may already be provisionally secured against unintentional separation, (e.g., by hooking, spot-welding or other joining methods).

If necessitated by the type of monolithic catalyst it is also possible to apply an additional catalytic component after the metal carrier consisting of already coated metal strips has been welded into the jacket tube or even to the provisionally secured metal matrix without jacket tube.

For instance, only a coating of finely dispersed high surface area metal oxide may be applied to the metal strips and impregnation, with a solution of catalytically active components such as precious metals and/or promoters, may take place only after said strips have been welded into the jacket tube or provisionally secured. The added promoters can include, for example, zirconium oxide, iron oxide, nickel oxide or any other known promoter or combination thereof.

By such an impregnation accumulation of the components applied in solution at the junctions between the metal strips in contact will not occur and the advantages of the monolithic catalyst according to the invention compared to a conventional catalyst with subsequent catalytic coating of a prefabricated metal carrier will be maintained. Even subsequent dispersion coating of the body of a monolithic catalyst produced from coated metal strips according to the invention leads to better coating results than if use is made of methods known hitherto, since with the process according to the invention the coating thickness throughout the cross-section of the cell is more uniform.

BRIEF DESCRIPTION OF THE DRAWINGS

The invention is explained in greater detail with reference to a number of embodiments.

DETAILED DESCRIPTION OF THE DRAWINGS

Figure 1:
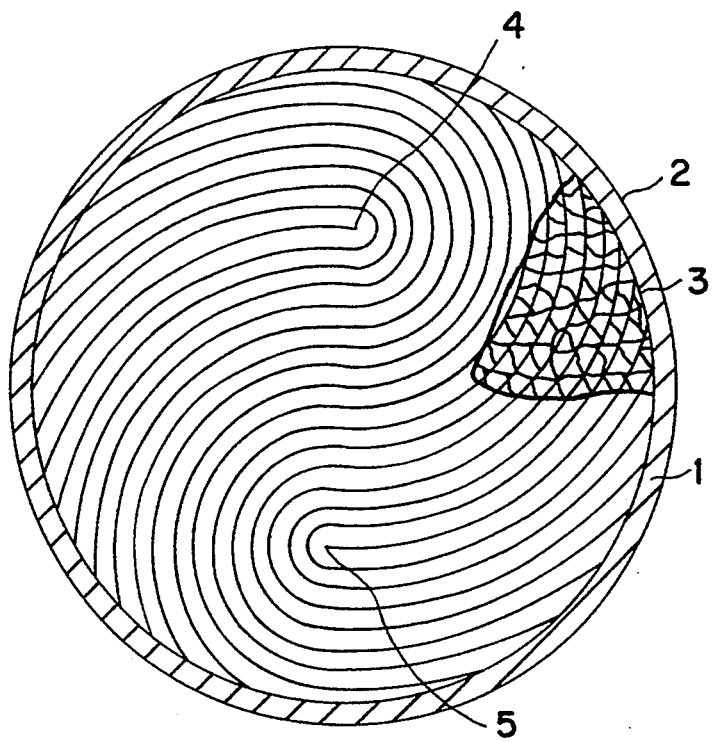
FIG. 1 shows a monolithic catalyst with a metal carrier comprising an S-shaped matrix of alternately corrugated and flat metal strips.

FIG. 1 shows a matrix of alternately arranged flat strips 2 and corrugated metal strips 3 wound in the manner of an S within a jacket tube 1 as described in EP 0 245 737. The matrix is produced from a rectangular stack of alternately flat and corrugated metal strips by winding them about the two fixed points 4 and 5.

Figure 2:
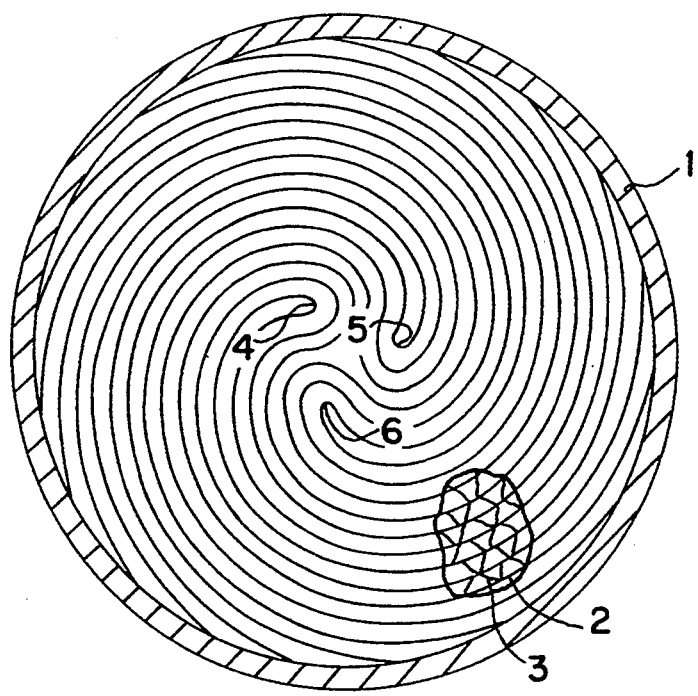
FIG. 2 shows a monolithic catalyst with a metal carrier comprising three folded and intertwined stacks of alternately flat and corrugated metal strips.

FIG. 2 shows a plan view of a matrix of three stacks of alternately arranged flat strips 2 and corrugated strips 3 folded along folding lines 4, 5 and 6 and intertwined within jacket tube 1 as described in DE-OS 38 32 243.

Figure 3:
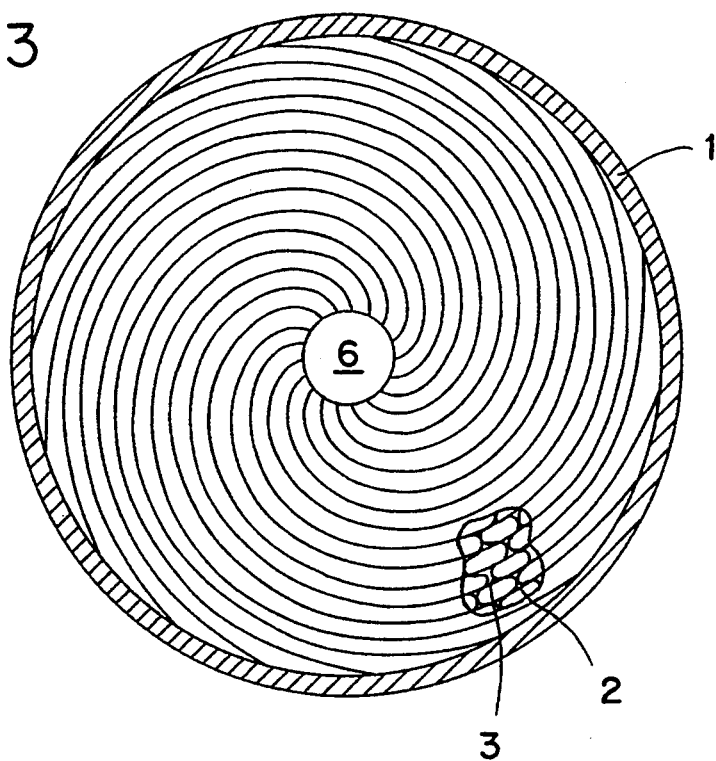
FIG. 3 shows a catalytic converter with a metal carrier comprising an involute-type matrix of alternately corrugated and flat metal strips.

FIG. 3 shows an involute-type matrix of alternately arranged flat strips 2 and corrugated metal strips 3 positioned within jacket tube 1 as described in EP 0 245 736. After catalytic coating, the metal strips are, according to requirements, corrugated, cut to length, welded at one end to a cylindrical insert 6 and then twisted in involute manner so as to form said matrix.

Figure 5:
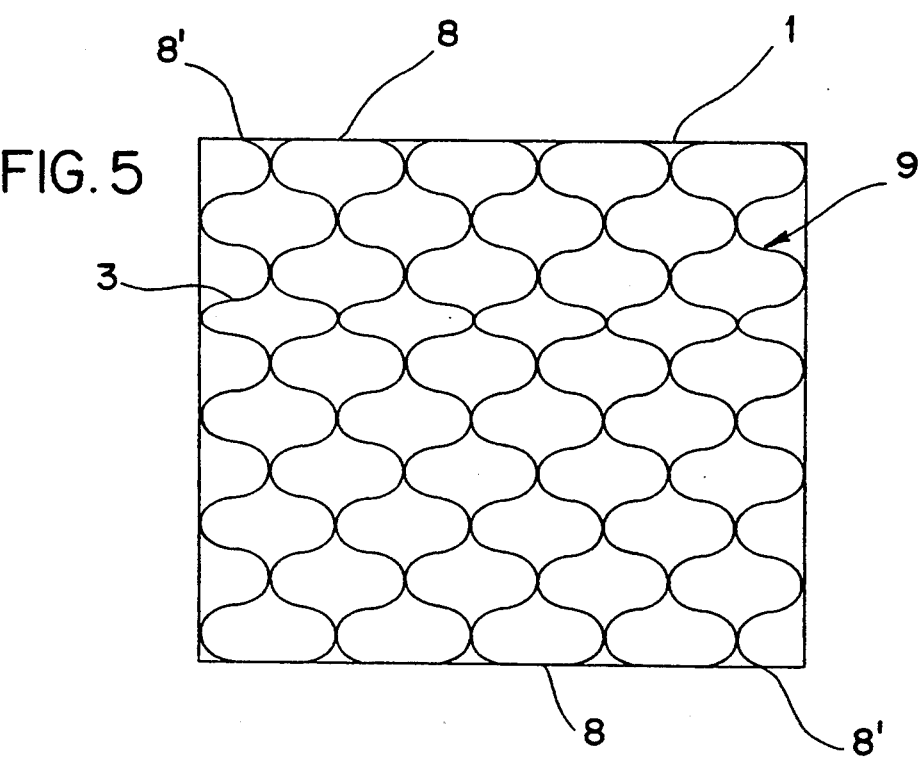
FIG. 5 provides a schematic illustration of an embodiment of the invention wherein the matrix in the jacket tube is comprised of a single metal ribbon.

FIG. 5 shows an embodiment of the invention wherein matrix 9 is comprised of a single coated metal strip identified by reference number 3. Metal strip 3 is shown to be corrugated and folded in a zigzag manner so as to form a stack of metal strip segments. Matrix 9 is secured to the interior of rectangular cross-section jacket tube 1 by a joining process such as welding. In a preferred embodiment, strip 3 is joined not only at its ends but also at every bend in the strip a few of which have been identified by reference number 8 in FIG. 5.

These four embodiments have in common the fact that the free ends of each metal strip are in contact with the inner surface of the jacket tube and firmly connected with the latter by welding. Since the metal strips are catalytically coated prior to forming the metal matrix, the coating of the monolithic catalysts with a metal carrier according to the invention is highly uniform and said monolithic catalysts can, moreover, be manufactured very economically.

Furthermore, catalytic coating material is saved, since material accumulations due to the action of capillary forces are avoided from the outset.

Figure 4A:
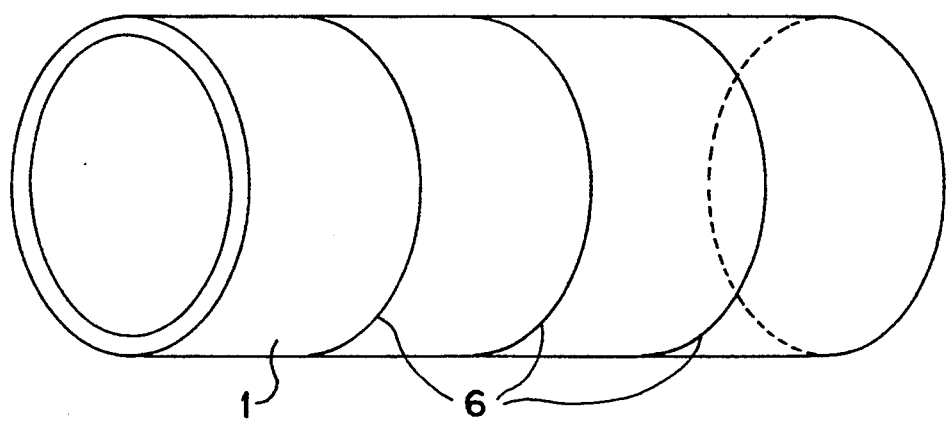
FIG. 4a shows a helical welding seam design for securing the free ends of the metal strips to the jacket tube.
Figure 4B:
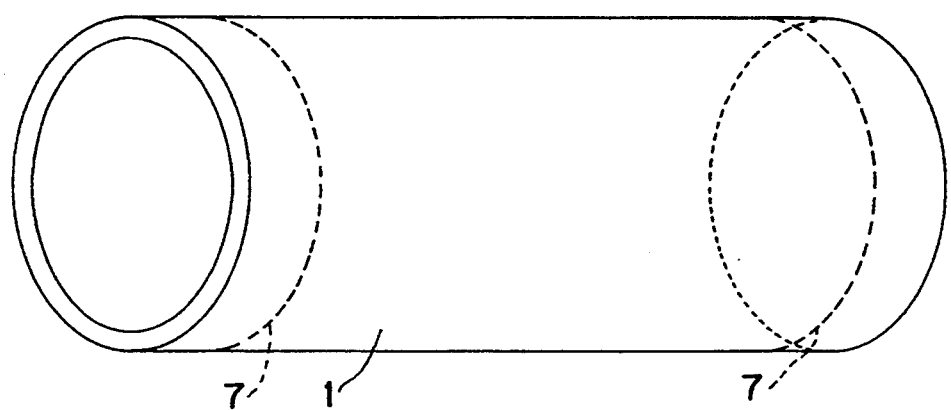
FIG. 4b shows intermittent annular welding seams for securing the free ends of the metal strips to the jacket tube.

FIGS. 4a and 4b show different embodiments of welding seams for durable attachment of the metal matrix to the surrounding jacket tube. In FIGS. 4a and 4b, reference number 1 designates the jacket tube, reference number 6 a helical welding seam and reference number 7 intermittent annular welding seams in the proximity of the ends of the jacket tube (e.g., from a free edge to within 25% of the total length of the jacket on opposite ends of the tube).

Although the preferred embodiments of the present invention have been described with reference to the accompanying drawings, many modifications and changes may be effected by those skilled in the art.

German Patent application P4233404.7 is incorporated herein by reference.

What is claimed is:

1. A monolithic catalyst comprising:

a matrix comprised of one or more metal strips arranged in at least one stack and having adjoining metal strip sections; and a jacket tube having an interior surface, said one or more metal strips having a coating of catalytic material and said one or more metal strips being joined to the interior surface of said jacket tube with welds or soldering joints, and the coating on said one or more metal strips being free from an increased accumulation of coating material along lines of contact between said adjoining metal strip sections based on an application of the coating of catalytic material on said one or more metal strips prior to said one or more metal strips being joined to said jacket tube.

2. A monolithic catalyst as recited in claim 1 wherein said matrix includes a plurality of metal strips each joined on at least one end to the interior surface of said jacket tube.

3. A monolithic catalyst as recited in claim 2 wherein said strips are arranged in at least one non-planar stack and said strips include corrugated strips or corrugated and flat strips with the flat and corrugated strips being arranged alternately.

4. A monolithic catalyst as recited in claim 3 wherein one stack is used and the stack is S-shaped.

5. A monolithic catalyst as recited in claim 3 wherein a plurality of stacks are folded and intertwined.

6. A monolithic catalyst as recited in claim 3 wherein said non-planar stack is arranged in an involute manner.

7. A monolithic catalyst as recited in claim 6, further comprising a central tubular member positioned within said jacket tube and said strips having a first end joined with said tubular member.

8. A monolithic catalyst as recited in claim 1 wherein said matrix includes a plurality of strips with each strip having ends that are free of coating material.

9. A monolithic catalyst as recited in claim 2 wherein at least some of said metal strips are joined to said interior surface by a helical welding seam.

10. A monolithic catalyst as recited in claim 2 wherein at least some of said metal strips are joined to said interior surface by at least one intermittent annular welding seam.

11. A monolithic catalyst as recited in claim 1 further comprising at least one additional matrix positioned within said jacket tube.

12. A monolithic catalyst as recited in claim 1 wherein said matrix includes a plurality of strips and wherein at least some of said metal strips are corrugated and feature end portions joined with said interior surface, and said end portions are flat or have corrugations that are of a lesser amplitude than corrugations positioned in an intermediate portion of said corrugated strips.

13. A monolithic catalyst as recited in claim 1 wherein said at least one precoated strip has at least one end portion joined with said interior surface which end portion is essentially free of coating material.

14. A monolithic catalyst as recited in claim 2 wherein said metal strips have apertures formed therein.

15. A method of forming a monolithic catalyst, comprising:

assembling at least one flat and/or corrugated metal strip previously coated with a catalytic support material comprising a high surface area metal oxide into a stack so as to form a matrix with gas passageways;

inserting said matrix into a jacket tube; and affixing said matrix to said jacket tube by welding or soldering said at least one metal strip to an interior surface of said jacket tube at points or lines of contact between said at least one strip and said interior surface.

16. A method as recited in claim 15 wherein said assembling step includes assembling a plurality of flat and/or corrugated metal strips previously coated with a catalytic support material comprising a high surface area metal oxide into a stack so as to form said matrix with gas passages.

17. A method as recited in claim 15 wherein said previously coated at least one strip further includes at least one catalytically active component which is added prior to assembling said stack.

18. A method as recited in claim 15 wherein said at least one coated strip further includes at least one catalytically active component which is impregnated after said matrix is affixed to said jacket tube.

19. A method as recited in claim 15 wherein said matrix includes at least one stack of metal strips and the method further comprising folding and intertwining said at least one metal stack so as to form a matrix with gas passages prior to inserting said matrix into said jacket tube.

20. A method as recited in claim 15 wherein said at least one metal strip includes apertures formed therein with each of said apertures formed in said at least one strip being free from blockage by said coating.

21. A method as recited in claim 15 wherein said coating of said at least one strip leaves end portions of said at least one strip free of any coating material, for affixing it to the jacket tube.

22. A method as recited in claim 15 wherein said stack includes a plurality of metal strips and said coating of said strips leaves an end portion on at least some of said strips free of any coating material, for affixing it to the jacket tube.

23. A method as recited in claim 15 further comprising removing coating material mechanically or chemically from an end portion of said at least one metal strip, which end portion is to be affixed to said jacket tube.

24. A method as recited in claim 15 further comprising applying a releasing agent to at least one end portion of said at least one strip prior to coating with said catalytic material which releasing agent prevents coating adherence to said at least one strip or facilitates later removal in a removal step.

25. A method as recited in claim 15 further comprising interconnecting said at least one metal strip in said stack prior to inserting said matrix into said jacket tube.

26. A method as recited in claim 15 wherein inserting said matrix into the jacket tube includes inserting at least one matrix into a first half of a clamp shell and then affixing a second half of a clamp shell to said first half of the clamp shell.

27. A method of forming a monolithic catalyst, comprising:

folding at least one flat and/or corrugated metal strip, previously coated with a catalytic coating, in a zigzag manner so as to form a matrix with gas passages;

inserting said matrix into a jacket tube; and affixing said coated matrix to said jacket tube by welding or soldering said at least one metal strip to an interior surface of said jacket tube at points or lines of contact between said strips and interior surface.

28. A method as recited in claim 27 further comprising intertwining a plurality of stacks made from a plurality of flat and/or corrugated metal strips.

29. A product produced by the method of claim 15 wherein said at least one metal strip is free from increased accumulation of coating material along lines of contact between adjoining metal strip sections based on using previously coated metal strips for composing the matrix and affixing said matrix in said jacket tube.

30. A monolithic catalyst as recited in claim 1 wherein each of said one or more metal strips is positioned in said jacket tube and each of said one or more metal strips has opposite ends with each opposite end joined directly to said jacket tube.

31. A monolithic catalyst as recited in claim 15 wherein each metal strip in said matrix is joined directly to said adjacent tube at least once.

32. A monolithic catalyst as recited in claim 31 wherein both opposite ends of each metal strip are affixed to an adjacent housing surface.

33. A method of forming a monolithic catalyst comprising:

coating at least one flat and/or corrugated metal strip with a catalyst material;

preparing at least one flat and/or corrugated metal strip so as to have at least one portion thereof free of a coating of said catalyst material;

positioning, subsequent to preparing, said at least one flat and/or corrugated metal strip such that said at least one portion comes into contact with an interior surface of a jacket tube;

after positioning, affixing said metal strip to said jacket tube by welding or soldering said metal strip to the interior surface of said jacket tube at a point or line of contact between said at least one portion and said interior surface.

34. A method as recited in claim 33 wherein preparing said at least one flat and/or corrugated metal strip occurs prior to coating.

35. A method as recited in claim 33 wherein preparing said at least one flat and/or corrugated metal strip occurs subsequent to coating and prior to positioning.

36. A monolithic catalyst produced by the method of claim 33.

37. A monolithic catalyst as recited in claim 1 comprising a plurality of metal strips arranged in a stacked relationship wherein opposite end portions of each of said metal strips are joined to said jacket tube by welds or solder joints such that each of said strips are free of additional weld or solder joints along a longitudinal length thereof.

38. A method as recited in claim 34 wherein said preparing of said at least one flat and/or corrugated metal strip includes having opposite end portions of said at least one flat and/or corrugated metal strip free of a coating of said catalyst material, and said metal strip is affixed to said jacked tube at said opposite end portions.

* * * * *